(12) United States Patent
Kim

(10) Patent No.: US 8,693,796 B2
(45) Date of Patent: Apr. 8, 2014

(54) IMAGE PROCESSING APPARATUS AND METHOD FOR PERFORMING A DISCRETE COSINE TRANSFORM

(75) Inventor: Young Hyun Kim, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 123 days.

(21) Appl. No.: 13/361,256

(22) Filed: Jan. 30, 2012

(65) Prior Publication Data

US 2012/0195516 A1    Aug. 2, 2012

(30) Foreign Application Priority Data

Feb. 1, 2011    (KR) .................. 10-2011-0009991

(51) Int. Cl.
    *G06K 9/36*    (2006.01)
(52) U.S. Cl.
    USPC ........................................... 382/250
(58) Field of Classification Search
    None
    See application file for complete search history.

(56) References Cited

U.S. PATENT DOCUMENTS

| | | | |
|---|---|---|---|
| 6,351,568 B1* | 2/2002 | Andrew | 382/239 |
| 2004/0071352 A1* | 4/2004 | Mizoguchi et al. | 382/233 |
| 2004/0117418 A1* | 6/2004 | Vainsencher et al. | 708/402 |
| 2007/0168908 A1* | 7/2007 | Paolucci et al. | 717/100 |
| 2007/0271321 A1* | 11/2007 | Reznik et al. | 708/402 |
| 2009/0015674 A1* | 1/2009 | Alley et al. | 348/144 |

FOREIGN PATENT DOCUMENTS

| | | |
|---|---|---|
| JP | 07-200539 A | 4/1995 |
| KR | 100124169 B | 9/1997 |

* cited by examiner

*Primary Examiner* — Bhavesh Mehta
*Assistant Examiner* — Feng Niu
(74) *Attorney, Agent, or Firm* — William Park & Associates Patent Ltd.

(57) ABSTRACT

An image processing apparatus and method providing a high speed pipeline structure having a low level of complexity is described. The image processing apparatus includes a memory configured to store a plurality of data in a plurality of memory locations, where an ordinally specified data is in a corresponding ordinal memory location.

15 Claims, 14 Drawing Sheets

1

IMAGE PROCESSING APPARATUS AND METHOD FOR PERFORMING A DISCRETE COSINE TRANSFORM

CROSS-REFERENCE TO RELATED APPLICATIONS

This application claims priority to Korean Patent Application No. 10-2011-0009991 filed on Feb. 1, 2011 in the Korean Intellectual Property Office, the disclosure of which is incorporated by reference in its entirely.

BACKGROUND OF THE INVENTION

1. Field of the Invention

The present invention relates generally to an image processing apparatus and method and, more particularly, to an image processing apparatus and method for performing a discrete cosine transform.

2. Description of the Related Art

Discrete cosine transform (DCT) and quantization processes perform lossy compression and have high complexity.

In order to compress an image, DCT converts image data in a spatial domain into DCT coefficients in a frequency domain, and as a result, DCT has the characteristic of decorrelation with energy compaction. DCT is calculated per block, and a converted DCT coefficient is divided into a low frequency region and a high frequency region in the block. A majority of energy components of a signal are concentrated in the low frequency region.

In the spatial domain, correlation between image data is high, while the DCT coefficients in the frequency domain eliminate correlation between coefficients. Accordingly, quantization eliminates signals of the high frequency region which do not significantly affect image quality to allow for the performing of lossy compression by using human visual system (HVS) characteristics.

Generally, a separable transform scheme is applied for a 2-dimensional DCT (2D-DCT) operation. In detail, one dimensional DCT (1D-DCT) is first performed on 8×8 pixel blocks in a row direction, and then another 1D-DCT is performed on the result in a column direction.

As shown in FIG. 1, the DCT operation is divided into a total of six stages, and has multiplication as shown in Table 1 below and fixed constants with respect to scaled DCT coefficients c0 to c7. Here, the computation (or calculation) of the scaled DCT coefficients c0 to c7 may be included in a quantization process in which a division operation is performed after the 2D-DCT in order to reduce computational quantity.

TABLE 1

| 0.125 | 0.090119978 | 0.095670858 | 0.106303762 | 0.125 | 0.159094823 | 0.230969883 | 0.453063723 |
| 0.090119978 | 0.064972883 | 0.068974845 | 0.076640741 | 0.090119978 | 0.114700975 | 0.166520006 | 0.326640741 |
| 0.095670858 | 0.068974845 | 0.073223305 | 0.081361377 | 0.095670858 | 0.121765906 | 0.176776695 | 0.346759961 |
| 0.106303762 | 0.076640741 | 0.081361377 | 0.090403918 | 0.106303762 | 0.135299025 | 0.19642374 | 0.385299025 |
| 0.125 | 0.090119978 | 0.095670858 | 0.106303762 | 0.125 | 0.159094823 | 0.230969883 | 0.453063723 |
| 0.159094823 | 0.114700975 | 0.121765906 | 0.135299025 | 0.159094823 | 0.202489301 | 0.293968901 | 0.576640741 |
| 0.230969883 | 0.166520006 | 0.176776695 | 0.19642374 | 0.230969883 | 0.293968901 | 0.426776695 | 0.837152602 |
| 0.453063723 | 0.326640741 | 0.346759961 | 0.385299025 | 0.453063723 | 0.576640741 | 0.837152602 | 1.642133898 |

In order to perform 1D-DCT on eight pixels, five multiplication processes and 29 addition processes must be performed, and in order to perform 2D-DCT on 8×8 pixel blocks, a total of 80 multiplication processes and 464 addition processes must be performed. When the separable transform scheme is employed to implement 2D-DCT with respect to 8×8 pixel blocks, an arithmetic operation unit must perform 10 multiplication processes (5×2=10) and 58 addition (29×2=58) processes.

The related art for 2D-DCT requires a relatively large computational quantity, which, thus, has difficulties in satisfying requirements of a SoC type CMOS image sensor for low complexity and high speed operation.

SUMMARY OF THE INVENTION

An aspect of the present invention provides an image processing apparatus and method having a high speed-based pipeline structure and low complexity.

According to an aspect of the present invention, there is provided an image processing apparatus including: a memory configured to store a plurality of data in a plurality of memory locations, where an ordinally specified data is in a corresponding ordinal memory location. The apparatus also includes an arithmetic operation unit configured to receive data from the memory and update the memory with results of arithmetic operations performed on the plurality of data. In a first stage the arithmetic operation unit is configured to update for use in a second stage a first memory location with a sum of first and eighth data, a second memory location with a sum of second and seventh data, a seventh memory location with a difference between the second and the seventh data, and an eighth memory location with a difference between the first and the eighth data.

According to an aspect of the present invention, there is provided an image processing method that includes initializing first to eighth data, where each of the first to eighth data comprises a plurality of bits. The method may also include updating in a first stage for use in a second stage the first data with a sum of the first and the eighth data, a second data with a sum of second and seventh data, a seventh data with a difference between the second and the seventh data, and an eighth data with a difference between the first and the eighth data.

BRIEF DESCRIPTION OF THE DRAWINGS

The above and other aspects, features, and advantages of the present invention will be more clearly understood from the following detailed description taken in conjunction with the accompanying drawings.

DETAILED DESCRIPTION OF THE PREFERRED EMBODIMENT

Figure 1:
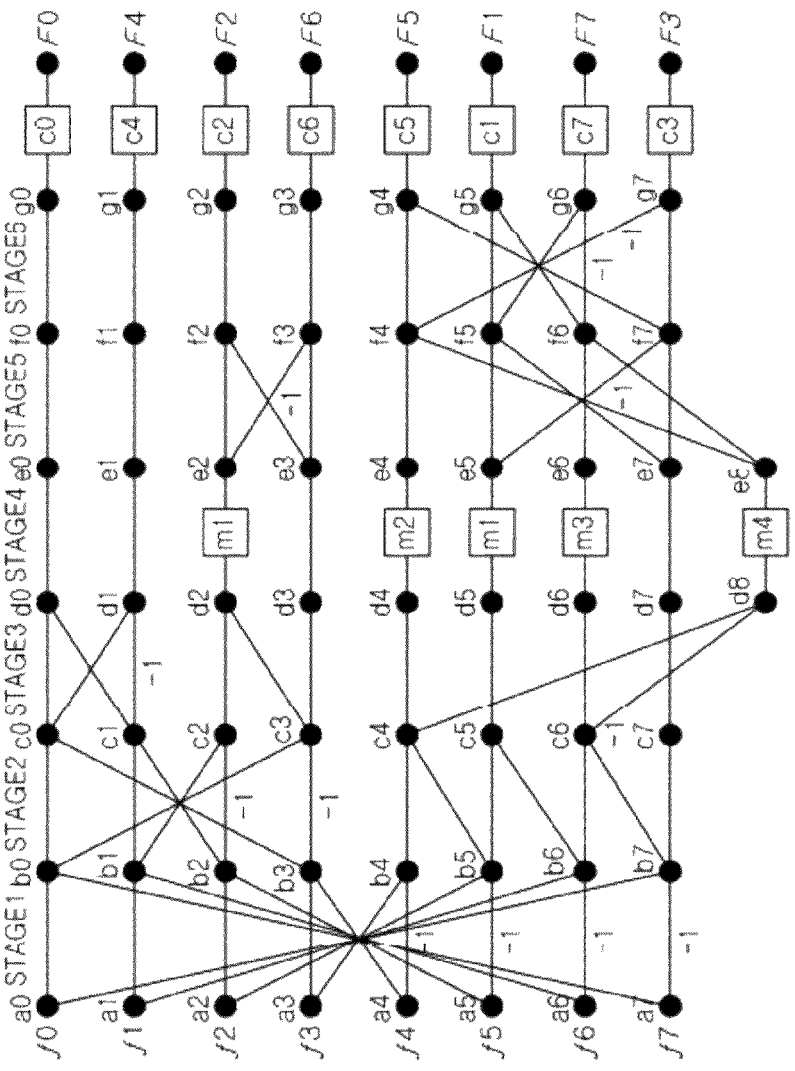
FIG. 1 is a view explaining a discrete cosine transform (DCT) operation according to a related art.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Throughout the specification and claims, unless explicitly described to the contrary, the word "comprise" and variations such as "comprises" or "comprising," will be understood to imply the inclusion of stated elements but not the exclusion of any other elements.

Figure 2:
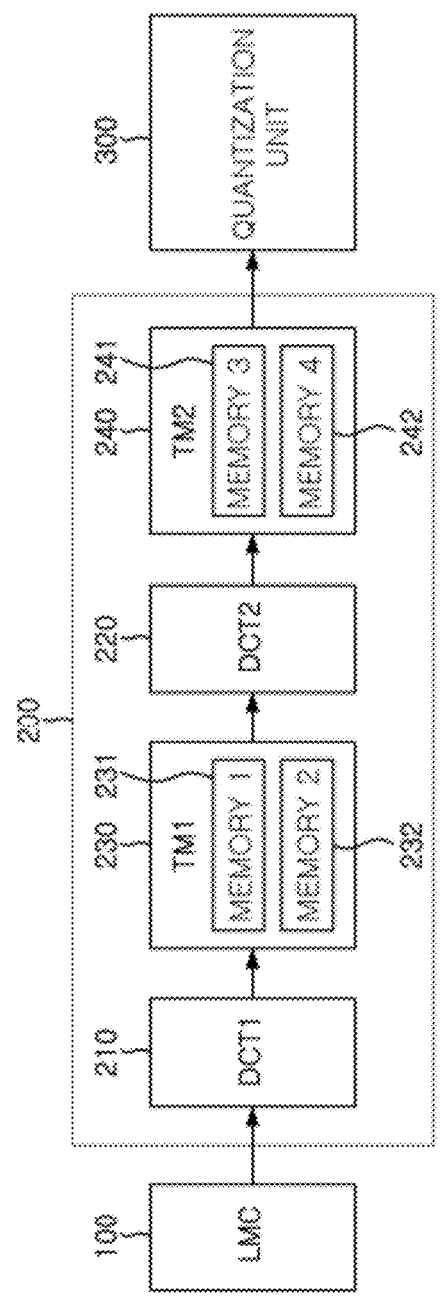
FIG. 2 is a view showing a partial structure of an exemplary image processing apparatus according to an embodiment of the present invention.

FIG. 2 is a view showing a partial structure of an exemplary image processing apparatus according to an embodiment of the present invention.

With reference to FIG. 2, the image processing apparatus may include a line memory controller (LMC) 100, a two-dimensional discrete cosine transform unit (2D-DCT) 200, and a quantization unit 300. The LMC 100 reads 8×8 pixel blocks of data from a line memory. The 2D-DCT unit 200 performs 2D-DCT on the 8×8 pixel blocks of data, and a quantization unit 300 performs quantization on the results of the two-dimensional discrete transform from the 2D-DCT unit 200 and provides the quantized results to a variable length coding (VLC) unit (not shown) at a rear stage. The 2D-DCT unit 200 may include a first discrete cosine transform unit DCT1 and a second discrete cosine transform unit DCT2. Each of DCT1 and DCT2 performs discrete cosine transform (DCT) by using, for example, three addition units, three subtraction units, and four multiplication units. A transpose memory 1 (TM1) 230 stores the results outputted from the DCT1 210 in a row direction and reads the stored results in a column direction to provide to the DCT2 220. A transpose memory 2 (TM2) 240 stores the results outputted from the DCT2 220 in a row direction and reads the stored results in a zigzag manner to provide to the quantization unit 300.

When the LMC 100 outputs data in units of 8×8 pixel blocks, the LMC 100 packs two 8-bit data into one 16-bit data.

The DCT1 210 receives the data in units of 8×8 pixel blocks from the LMC 100 and performs DCT thereon. The data outputted from the DCT1 210 is delivered to the DCT2 220 in the column direction through the TM1 230. When the DCT2 220 performs DCT on the data transferred through the TM1 230, the TM2 240 converts the resultant data into zigzag reordering sequence data and provides the stored data to the quantization unit 300.

Figure 3:
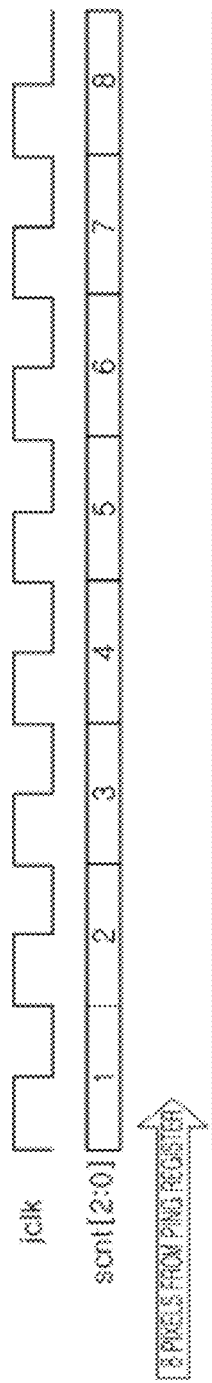
FIG. 3 is a view explaining an exemplary discrete cosine transform (DCT) operation according to an embodiment of the present invention.

FIG. 3 is a view for explaining an exemplary discrete cosine transform (DCT) operation according to an embodiment of the present invention. A fast DCT process called the AAN DCT according to an embodiment of the present invention is optimized in structure in terms of timing and domain so as to be suitable for hardware implementation.

As shown in FIG. 3, arithmetic operation units required for DCT according to an embodiment of the present invention include three addition units ADD0 to ADD2, three subtraction units SUB0 to SUB2, and four multiplication units MUL0 to MUL3. These arithmetic operation units perform DCT according to an arithmetic operation process determined in each step by using a step counter scnt[2:0] having a 3-bit width. The addition units ADD0 to ADD2 and subtraction units SUB0 to SUB2 may require a calculation time of one clock, while the multiplication units MUL0 to MUL3 may require a calculation time of two clocks.

Nine pong registers p0_r0[15:0]~p0_r8[15:0] store outputs from the arithmetic operation units, and in particular, the ninth pong register retrieves an input of a multiplication process from a different pong register and stores it in order to allow the multiplication units MUL0~MUL3 requiring the calculation time of two clocks to smoothly operate.

The operation of the fast AAN DCT is designed to be performed in real-time with minimum logic, and the operation is performed in order in the direction indicated by the arrows in FIG. 3 along with the step counter scnt[2:0]. Namely, after eight pong registers p0_r0[15:0]~p0_r7[15:0] are initialized with eight ping data provided by the LMC 100, the arithmetic operation units ADD0~ADD2, SUB0~SUB2, and MUL0~MUL3 receive the data currently stored in the pong registers at every clock and perform calculation, and update the pong registers with the calculated values for a next operation.

In stage 1 (scnt=1), the sum of a first and an eighth data (b0=a0+a7) is written to the first register, the sum of a second and a seventh data (b1=a1+a6) is written to the second register, the difference between the second and the seventh data (b6=a1−a6) is written to the seventh register, and the difference between the first and eighth data (e7=a0−a7) is written to the eighth register. The other registers remain the same.

In stage 2 (scnt==2), the sum of a third and a sixth data (b2=a2+a5) is written to the third register, the sum of a fourth and a fifth data (b3=a3+a4) is written to the fourth register, the difference between the fourth and the fifth data (b4=a3−a4) is written to the fifth register, and the difference between the third and the sixth data (b5=a2−a5) is written to the sixth data. The other registers remain the same.

In stage 3 (scnt==3), the sum of the fifth and the sixth data (c4=b4+b5) is written to the fifth register, the sum of the sixth and the seventh data (d5=b5+b6) is written to the sixth register, and the sum of the seventh and the eighth data (c6=b6+b7) is written to the seventh register. The other data remain the same.

In stage 4 (scnt==4), the sum of the first and the fourth data (c0=b0+b3) is written to the first register, the sum of the second and the third data (c1=b1+b2) is written to the second register, the difference between the second and the third data (c2=b1−b2) is written to the third register, the difference between the first and the fourth data (c3=b0−b3) is written to the fourth register, and the difference between the fifth and the seventh data (d6=c4−c6) is written to the ninth register. The other data remain the same. In a first clock of a 2-clock multiplication, the second cosine constant and the fifth data are multiplied (e4=m2c4), a first cosine constant and the sixth data are multiplied (e5=m1d5), and a third cosine constant and the seventh data are multiplied (e6=m3c6).

In stage 5 (scnt==5), the sum of the first and the second data (g0=c0+c1) is written to the first register, the difference between the first and the second data (g1=c0−c1) is written to the second register, and the sum of the third data and the fourth data (d2=c2+c3) is written to the third register. In the second clock of the 2-clock multiplication, the product of the second cosine constant and the fifth data (e4=m2c4) is written to the fifth register, the product of the first cosine constant and the sixth data (e5=m1d5) is written to the sixth register, and the product of the third cosine constant and the seventh data (e6=m3c6) is written to the seventh register. In the first clock of the 2-clock multiplication, the fourth cosine constant and the ninth data (e8=m4d8) are multiplied. The other data remain the same.

In stage 6 (scnt==6), the sum of eighth and sixth data (f5=e7+e5) is written to sixth register, and the difference between the eighth and sixth data (f7=e7−e5) is written to the eighth register. In the second clock of the 2-clock multiplication, the product of the fourth cosine constant and the ninth data (e8=m4d8) is written to the ninth register. In the first clock of the 2-clock multiplication, the first cosine constant and the third data (e2=m1d2) are multiplied. The other data remain the same.

In stage 7 (scnt==7), in the second clock of the 2-clock multiplication, the product of the first cosine constant and the third data (e2=m1d2) is written to the third register. The sum of the fifth data and the eighth data (f4=e4+e8) is updated into the fifth register, and the sum of the seventh and the eighth data (f6=e6+e8) is written to the seventh register. The other data remain the same.

At stage 8 (scnt==8), the sum of the fourth and the third data (g2=c3+e2) is written to the third register, the difference between the fourth and the third data (g3=c3−e2) is written to the fourth register, the sum of the eighth and the fifth data (g4=f7+f4) is written to the fifth register, the sum of the sixth and the seventh data (g5=f5+f6) is written to the sixth register, the difference between the sixth and the seventh data (g6=f5−f6) is written to the seventh register, and the difference between the eighth and the fifth data (g7=f7−f4) is written to the eighth register. Thereafter, the previously obtained first and second data (g0, g1) and the currently obtained third to eighth data (g2~g8) are provided, for example, serially to the memories TM1 230 or TM2 240.

When DCT is performed on the eight pixels in this order, a total of eight clock cycles is required as a calculation time, and 17 clock cycles are required as pipelined latency taken from a first frame until when a first DCT result is obtained.

Figure 4:
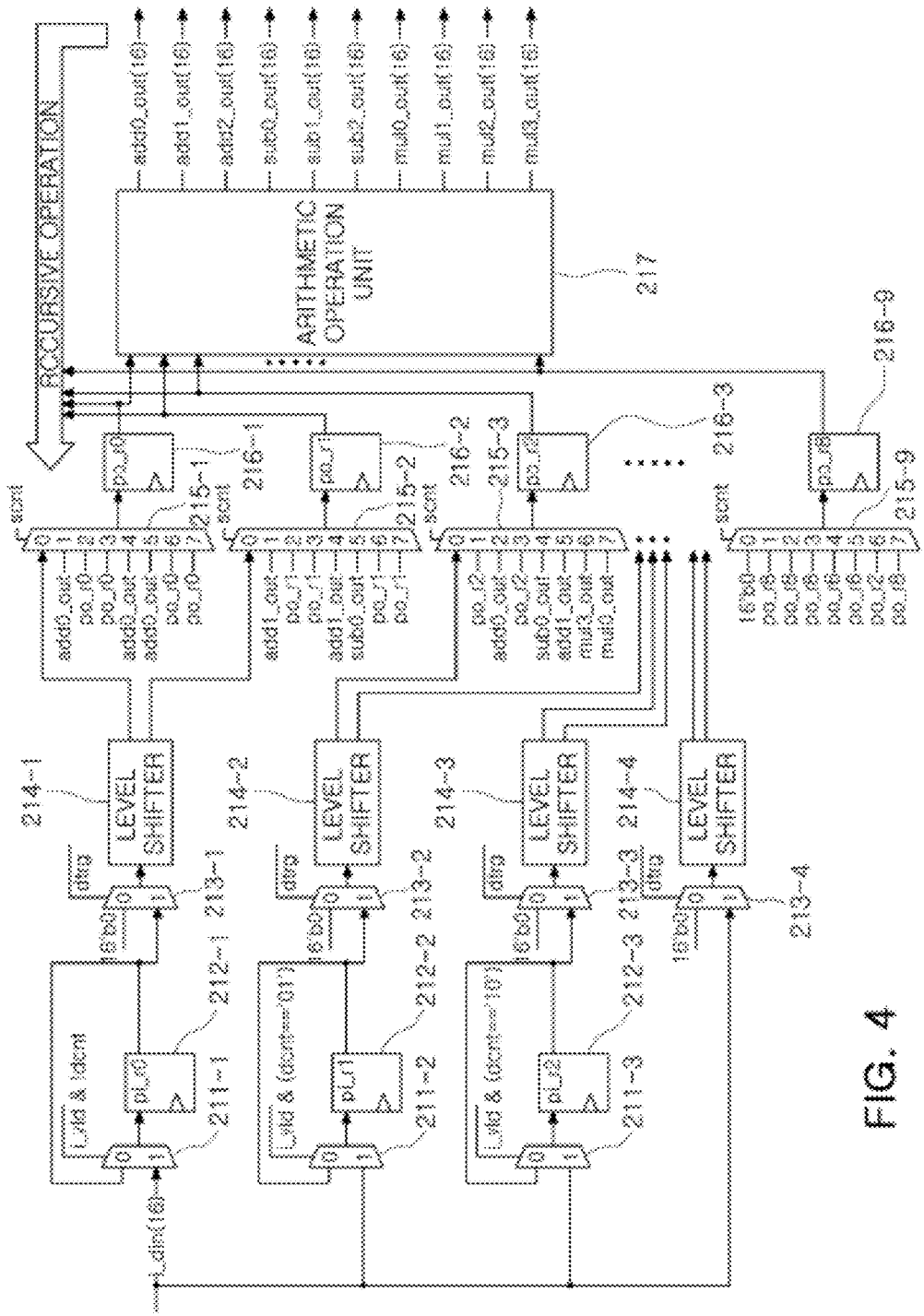
FIG. 4 is a block diagram showing an exemplary configuration of a DCT1 according to an embodiment of the present invention.

FIG. 4 is a block diagram showing an exemplary configuration of the DCT1 210 according to an embodiment of the present invention.

With reference to FIG. 4, the DCT1 210 may include three multiplexers 211-1 to 211-3, three ping registers 212-1 to 212-3, four multiplexers 213-1 to 213-4, four level shifters 214-1 to 214-4, nine multiplexers 215-1 to 215-9, nine pong registers 216-1 to 216-9, and an arithmetic operation unit 217.

The multiplexers 211-1 to 211-3 and 213-1 to 213-4 may be implemented as 2-input and 1-output multiplexers (2×1 MUX), the multiplexers 215-1 to 215-9 may be implemented as 8-input and 1-output multiplexers (8×1 MUX), and the ping registers 212-1 to 212-3 and the pong registers 216-1 to 216-9 may be implemented as registers having a 16-bit width.

The multiplexers 211-1 to 211-3 store first input 16-bit data in the ping register 212-1 (i_vid&(dcnt=='00')), second input 16-bit data in the ping register 212-2 (i_vid&(dcnt=='01'), and third input 16-bit data in the ping register 212-3 (i_vid&(dcnt=='10').

In this state, when fourth 16-bit data is input, the level shifter 214-4 delivers the fourth input 16-bit data to the multiplexer 215-1 to 215-9, and at the same time, the other remaining level shifters 214-1 to 214-3 deliver the data stored in the ping registers 212-1 to 212-3 to the multiplexers 3 215-1 to 215-9. The 16-bit data is unpacked through the level shifters 214-1 to 214-4, and a data range is converted from 0~255 to −128~127. The data range conversion operation can be easily implemented by inverting a most significant bit (MBS) of the input data.

The multiplexers 215-1 to 215-9 update the pong registers 216-1 to 216-9 by using the outputs from the level shifters 214-1 to 214-4 and the outputs from the arithmetic operation unit 217, and the arithmetic operation unit 217 performs the operation procedure as shown in FIG. 3 by using the data stored in the pong registers 216-1 to 216-9.

This operation is iteratively performed until such time as the DCT operation of the DCT1 210 is completed, and the pong registers 216-1 to 216-9 are iteratively updated.

Figure 5:
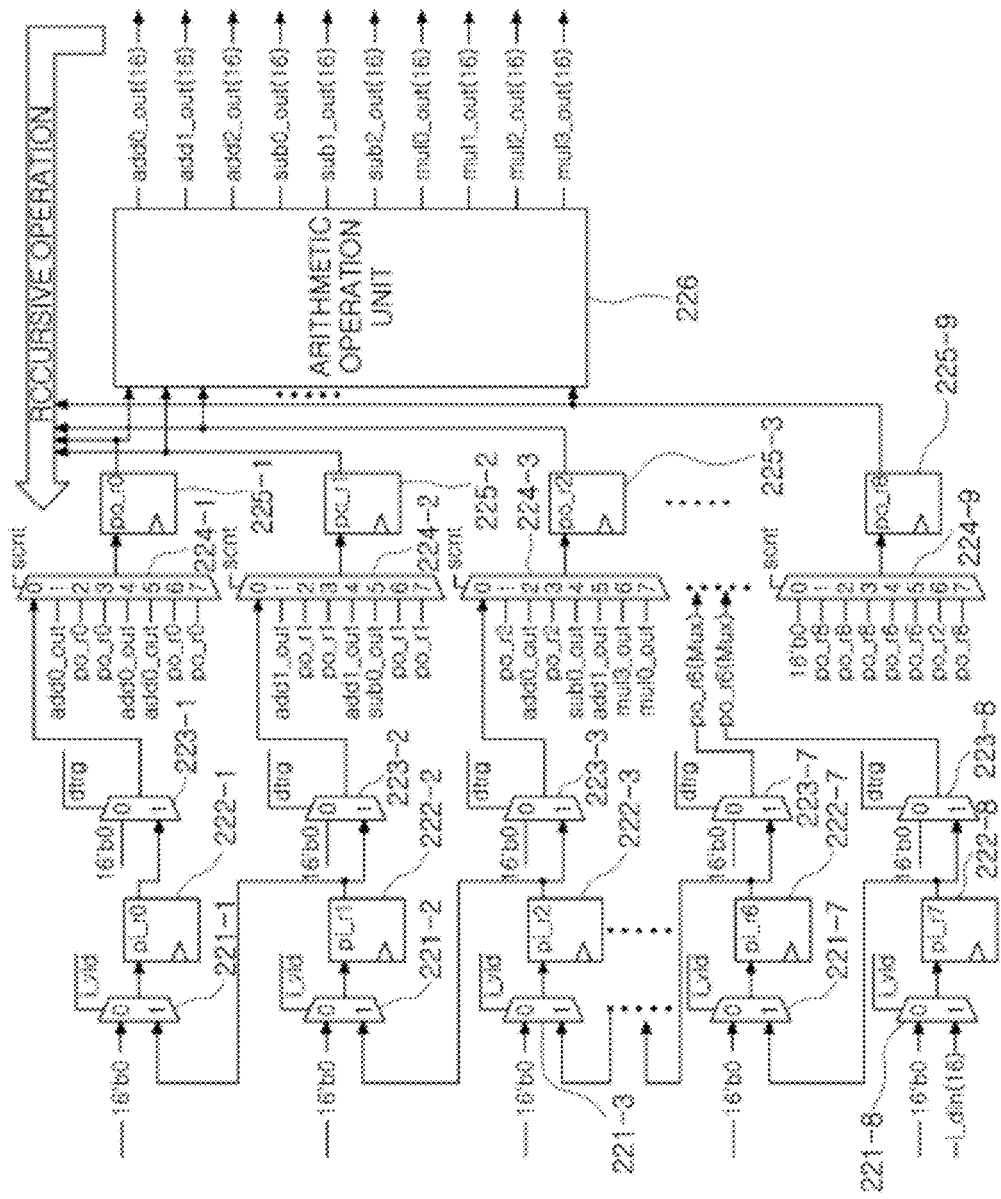
FIG. 5 is a block diagram showing an exemplary configuration of a DCT2 according to an embodiment of the present invention.

FIG. 5 is a block diagram showing an exemplary configuration of the DCT2 220 according to an embodiment of the present invention. With reference to FIG. 5, the DCT2 220 according to an embodiment of the present invention is configured and operated in a similar manner to the DCT1 210, except that the DCT2 220 includes eight 16-bit ping registers, instead of three 16-bit ping registers, and does not have level shifters like those in the DCT1 210.

The DCT2 220 does not need level shifters because DCT1 has already performed data conversion. The reason for replacing the three 16-bit ping registers with eight 16-bit ping registers is because unpacked data is used in the DCT2 220.

Figure 6:
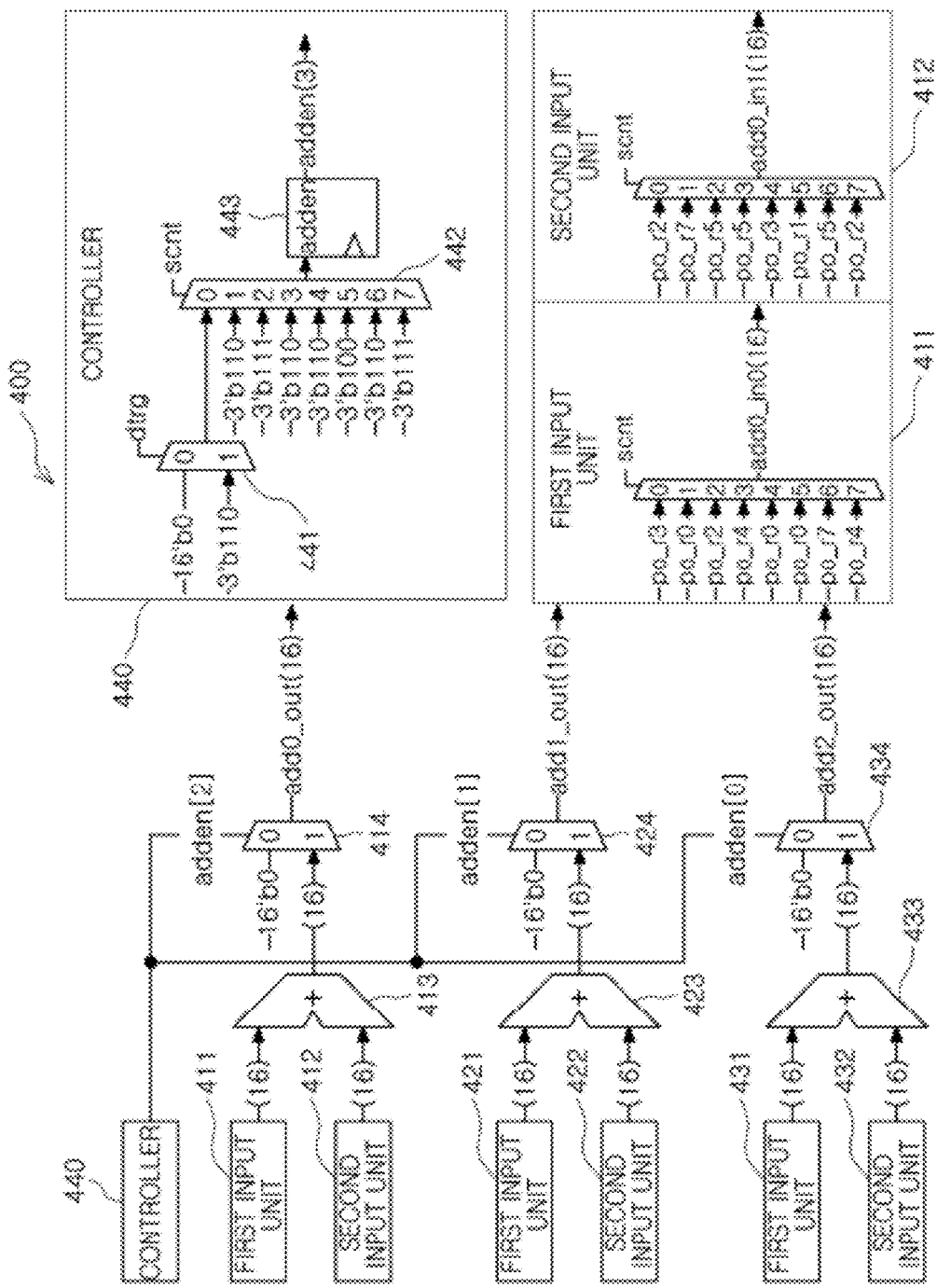
FIG. 6 is a view showing an exemplary configuration of three addition units of an arithmetic operation unit according to an embodiment of the present invention.

FIG. 6 is a view showing an exemplary configuration of the three addition units of the arithmetic operation unit according to an embodiment of the present invention, in which inputs and outputs of the addition units are 16 bits and operate in one clock cycle.

With reference to FIG. 6, the three addition units 400 include three adders 413 to 433, first and second input units 411, 421, 431, and 412, 422, 432 controlling inputs to the adders 413 to 433, multiplexers 414 to 434 controlling outputs from the adders 413 to 433, and a controller 440 generating signals adden[0:2] for controlling operation of the multiplexers 414 to 434. The controller 440 includes a 2×1 multiplexer 441, a 8×1 multiplexer 442, and a flipflop 443, and generates a 3-bit operation control signal adden(3).

The first and second input units 411, 421, 431, and 412, 422, 432 provide the data stored in the pong registers 216-1 to 216-9 to the adders 413 to 433 according to the operation procedure of FIG. 3. For example, as described with respect to FIG. 3, the first input unit 411 connected to the adder 413 may sequentially output first data a0, third data a2, fifth data b4, first data b0, first data c0, eighth data e7, fifth data e4, and fourth data c3. Similarly, the second input unit 412 may sequentially output eighth data a7, sixth data a6, sixth data b5, fourth data b3, second data c1, sixth data e5, ninth data e8, and fourth data c3.

Then, the adders 413 to 433 may add the outputs from the first and second input units 411, 421, 431, and 412, 422, 432, and the multiplexers 414 to 434 may select addition results to be provided to the multiplexers 215-1 to 215-9 according to a control signal (adden[0], [1], [2]) from the controller 440.

Figure 7:
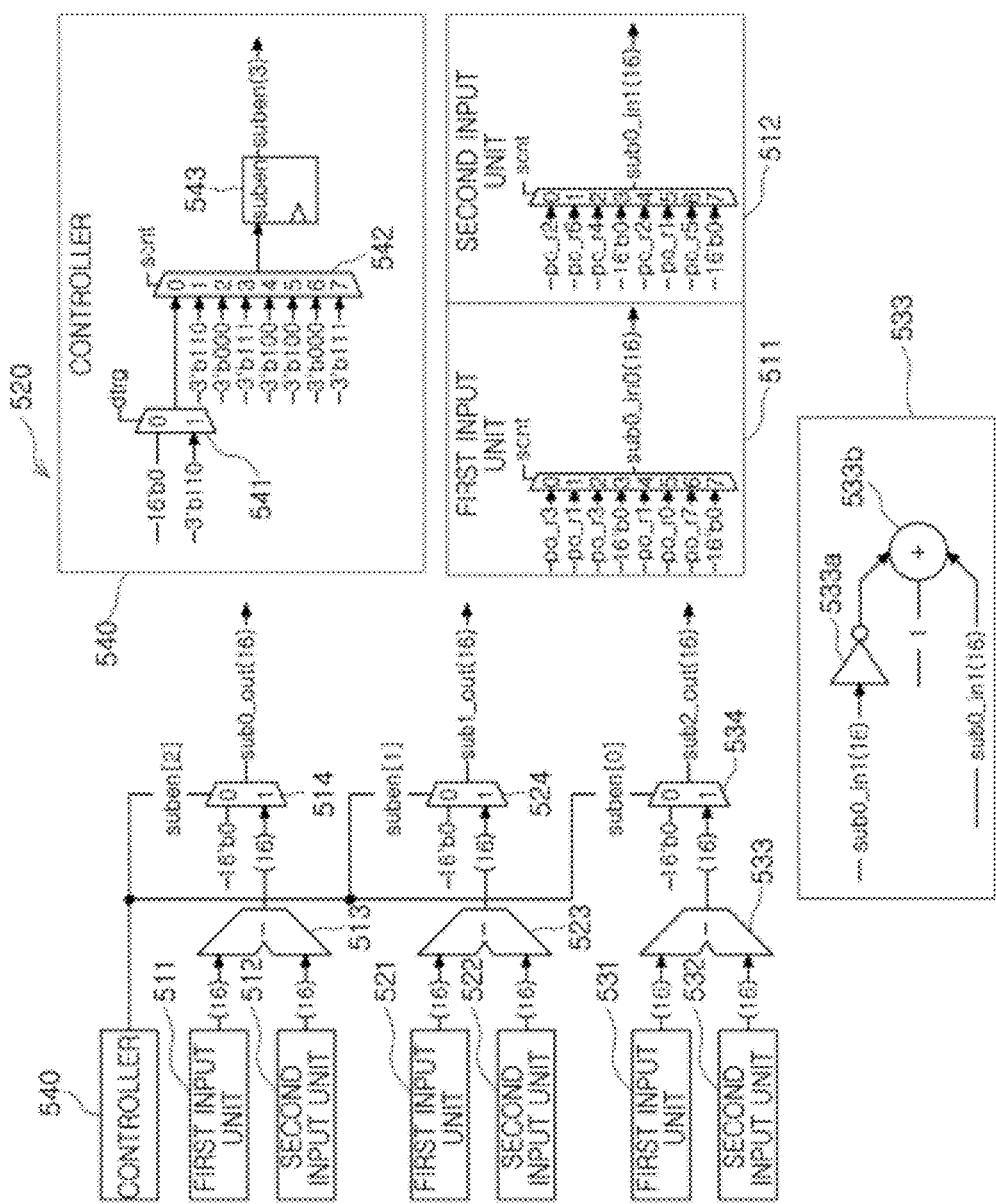
FIG. 7 is a view showing an exemplary configuration of three subtraction units of the arithmetic operation unit according to an embodiment of the present invention.

FIG. 7 is a view showing an exemplary configuration of the three subtraction units of the arithmetic operation unit according to an embodiment of the present invention. In FIG. 7, the three subtraction units are configured and operated in a similar manner to the three addition units of FIG. 6.

The three subtraction units 500 in FIG. 7 include three subtractors 513 to 533 that are able to perform a 2's complement operation, first and second input units 511, 521, 531, and 512, 522, 532 controlling inputs to the subtractors 513 to 533, multiplexers 514 to 534 controlling outputs from the subtractors 513 to 533, and a controller 540 generating a signal suben[0:2] for controlling operation of the multiplexers 514 to 534. The subtractors 513 to 533 may be implemented as an inverter 533a inverting second data sub0_in2(16) and an adder 533b adding 1 and first data sub0_in1(16) to an output from the inverter 533a.

Figure 8:
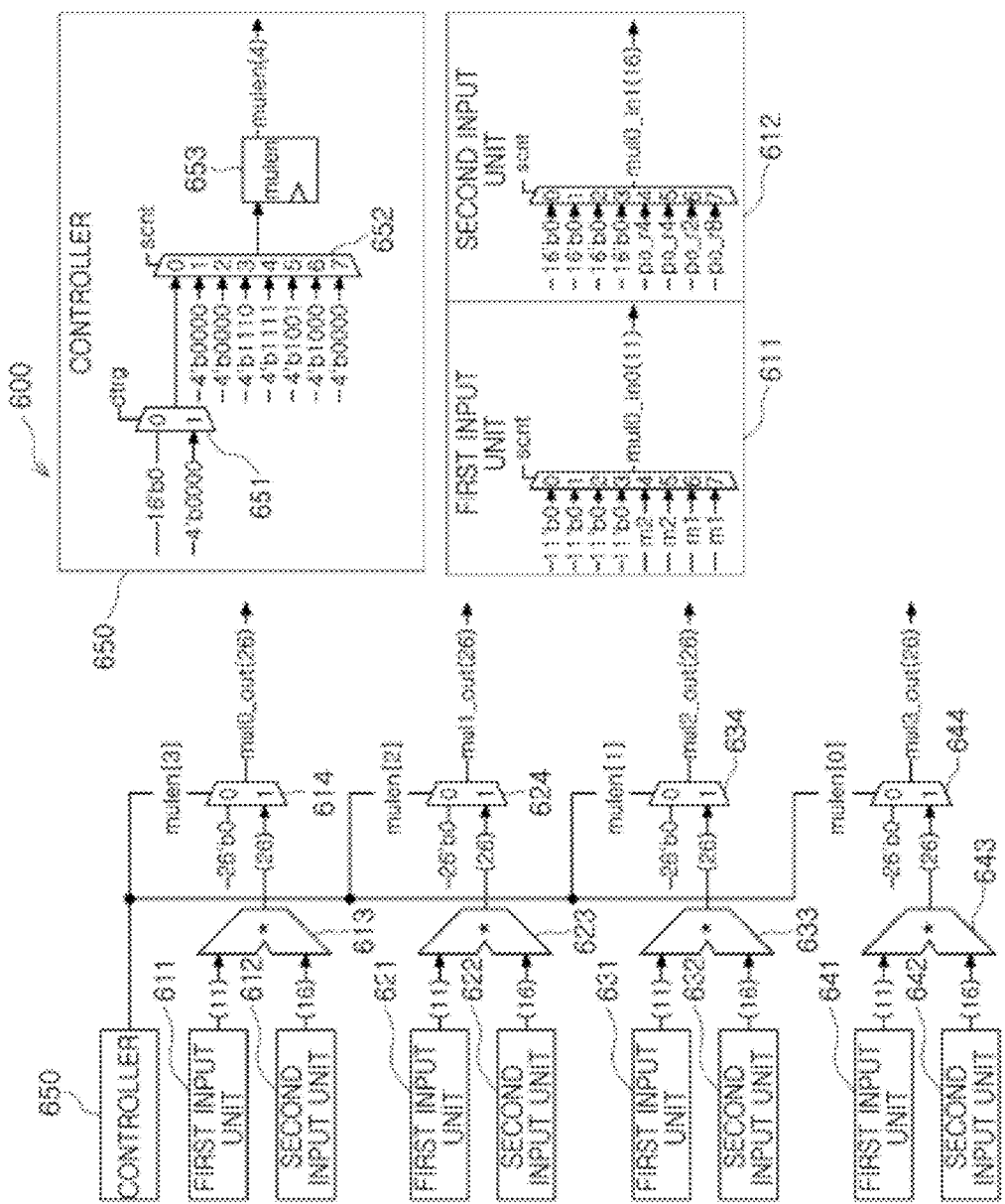
FIG. 8 is a view showing an exemplary configuration of four multiplication units of the arithmetic operation unit according to an embodiment of the present invention.

FIG. 8 is a view showing an exemplary configuration of the four multiplication units of the arithmetic operation unit according to an embodiment of the present invention. The four multiplication units in FIG. 8 are configured and operate in a similar manner to the three addition units.

The four multiplication units 600 of FIG. 8 may include four multipliers 613 to 643 performing a multiplication operation, first and second input units 611, 621, 631, 641 and 612, 622, 632, 642 controlling inputs to the multipliers 613 to 643, multiplexers 614 to 644 controlling outputs from the multipliers 613 to 643, and a controller 650 generating signal mulen[0:4] for controlling the operation of the multiplexers 614 to 644.

Here, the multipliers 614 to 644 is required to process data having a data range including a negative number, so they must be able to perform both a shift operation and addition (shift+adder) along with a signed extension.

The first input units 611, 621, 631, and 641 first divide cosine constants m1 to m4 including floating points into a 1-bit integral part and 10-bit decimal part, and assigns a total of 11 bits, and the second input units 612, 622, 632, and 642 receive 16-bit data from the pong registers. The multipliers 614 to 644 perform a rounding operation by using the outputs from the first and second inputs 611, 621, 631, 641 and 612, 622, 632, 642 to generate 26 bits, and selectively stores only 16-bit integral part in a corresponding pong register.

Figure 9:
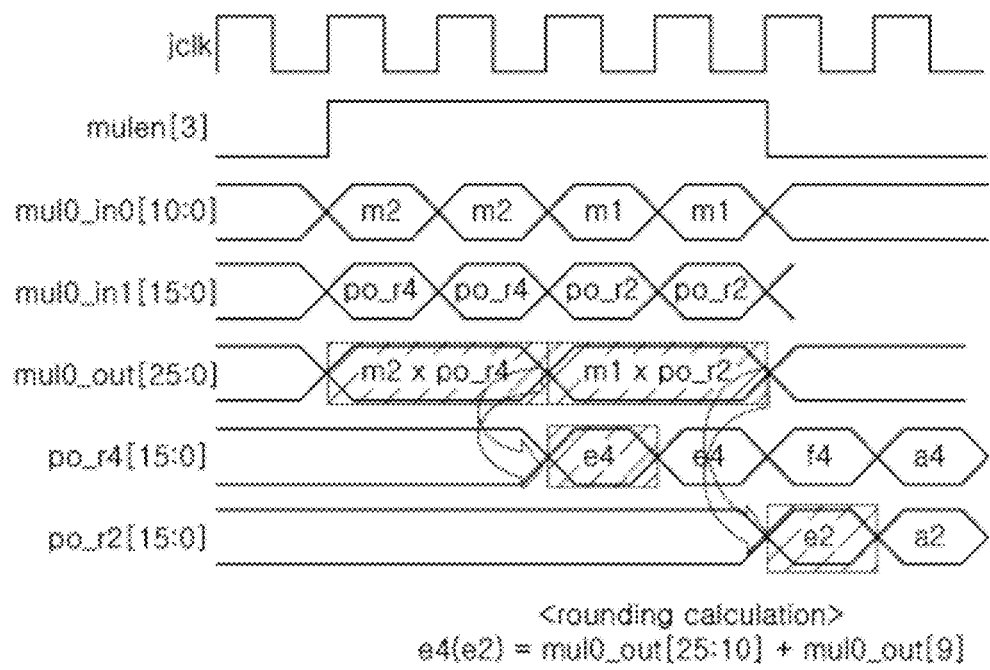
FIG. 9 is a signal timing diagram showing an operational example of the multiplication units according to an embodiment of the present invention.

The four multiplication units 600 are designed by using a multi-cycle path as shown in FIG. 9 to secure a timing margin, and an operation cycle time is 2 clock cycles.

Figure 10:
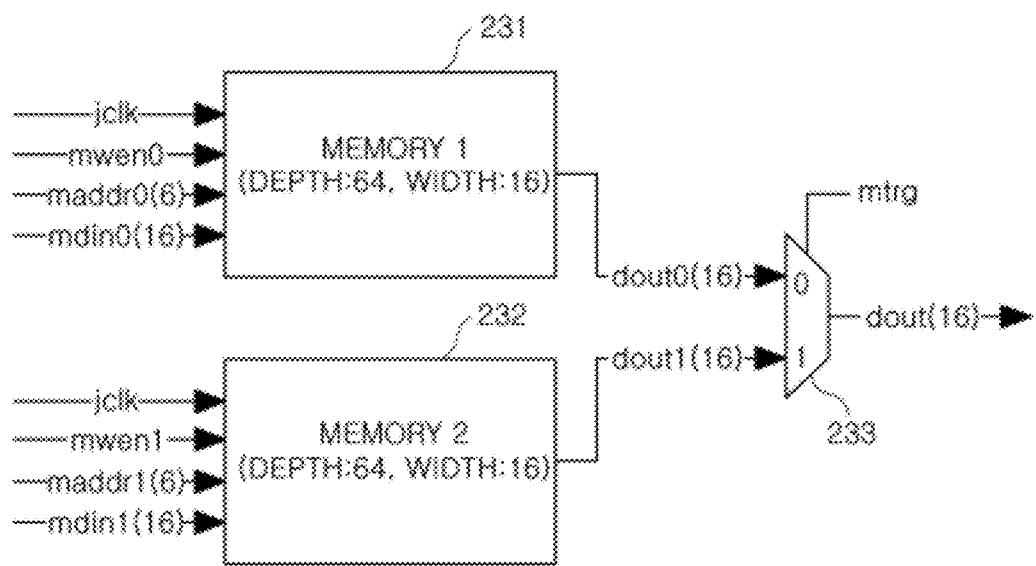
FIG. 10 is a view showing an exemplary configuration of a first transpose memory TM1 according to an embodiment of the present invention.

FIG. 10 is a view showing an exemplary configuration of the TM1 230 according to an embodiment of the present invention.

The TM1 230 of FIG. 10 includes two register type single-port block memories 231 and 232 each having a 64-bit depth and 16-bit width, and a multiplexer 233 selectively outputting one of outputs from the memories 231 and 232. The TM1 230 performs memory access in a pingpong manner as shown in FIG. 11.

A write activation signal mwen, a 6-bit memory address signal maddr(6), and a 16-bit memory input mdin(16), and a clock signal jclk are used to read data dout0(16) and dout1(16) from the single-port block memories 231 and 232, respectively. One of the output data dout0(16) and dout1(16) are selected by a memory trigger (mtrg) signal as a 16-bit output dout(16) of the TM1 230.

Figure 11:
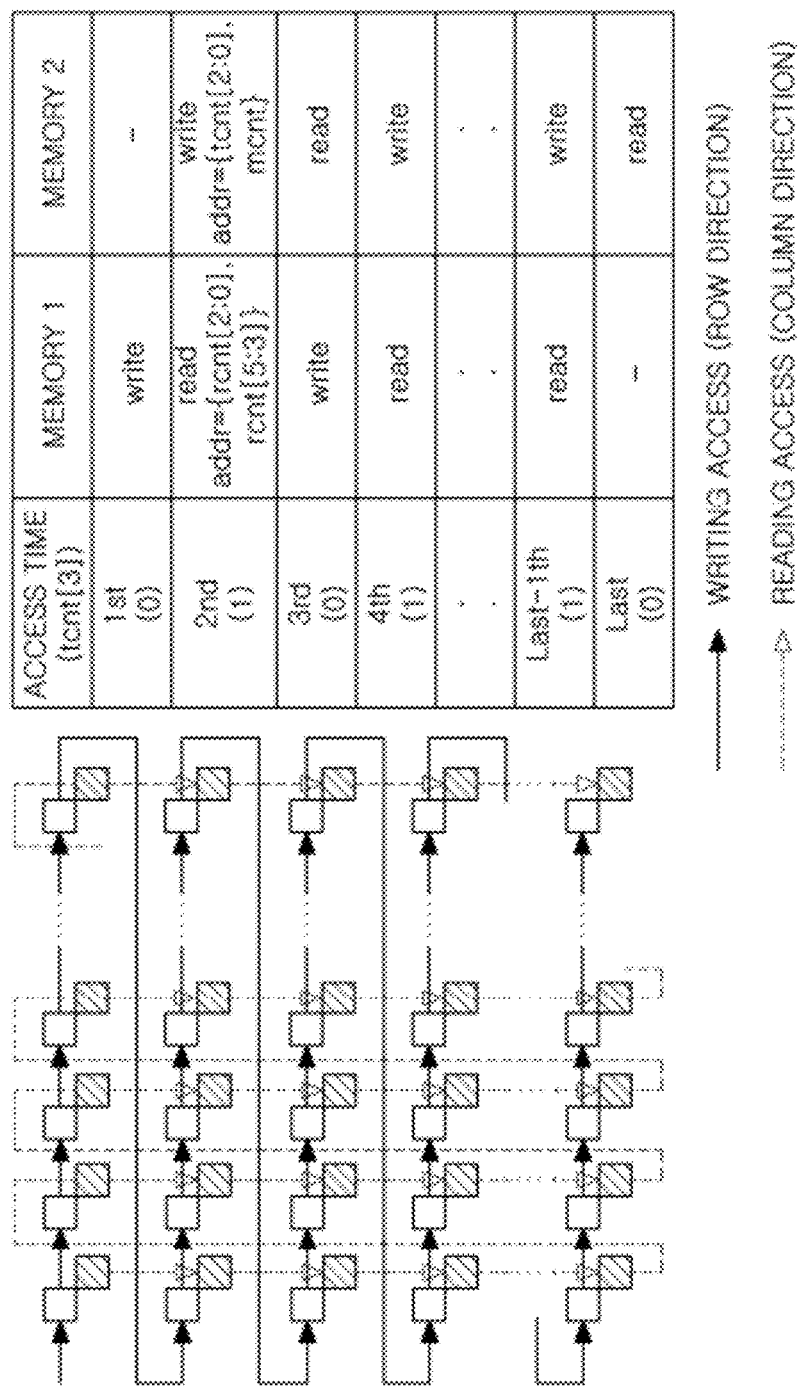
FIG. 11 is a view showing an exemplary pingpong type memory accessing procedure used by the TM1 according to an embodiment of the present invention.

FIG. 11 is a view showing an exemplary pingpong type memory accessing procedure used by the TM1 230 according to an embodiment of the present invention.

As shown in FIG. 11, write access is performed in the row direction, and read access is performed in the column direction. Data, which have passed through the DCT in the row direction, are stored in one of the single-port block memories 231 and 232 in the row direction, while data are read in the column direction from the other of the single-port block memories 231 and 232.

Here, a memory address (addr) is generated by using a partial combination of counter signals (rcnt[2:0], rcen[5:3]) and (rcnt[2:0], mcen) with respect to reading and writing.

Figure 12:
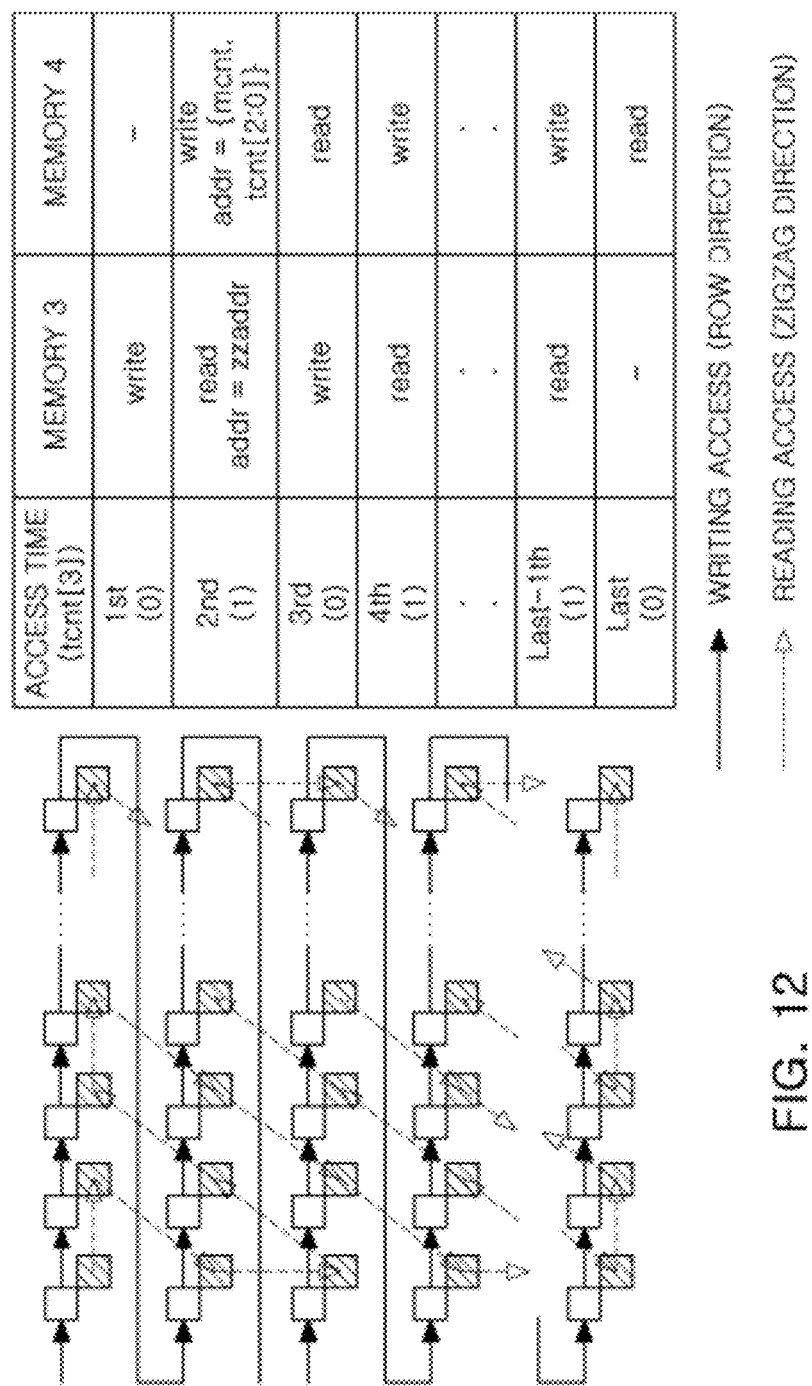
FIG. 12 is a view showing an exemplary pingpong type memory accessing procedure used by a second transpose memory TM2 according to an embodiment of the present invention.

The TM2 240 according to an embodiment of the present invention is configured as shown in FIG. 10, but it performs a memory accessing procedure as shown in FIG. 12 to zigzag-reorder data output from the DCT2 220

FIG. 12 is a view showing an exemplary pingpong type memory access procedure used by the TM2 according to an embodiment of the present invention.

As shown in FIG. 12, write access is performed in the row direction and read access is performed in a zigzag manner. A read address is generated by using a memory (ROM) having a 62-bit depth and a 16-bit width formed by zigzag reordering sequence mapping (addr=zzaddr), and a write address is generated by using a partial combination of counter signals (mcen,rcnt[2:0]).

Figure 13:
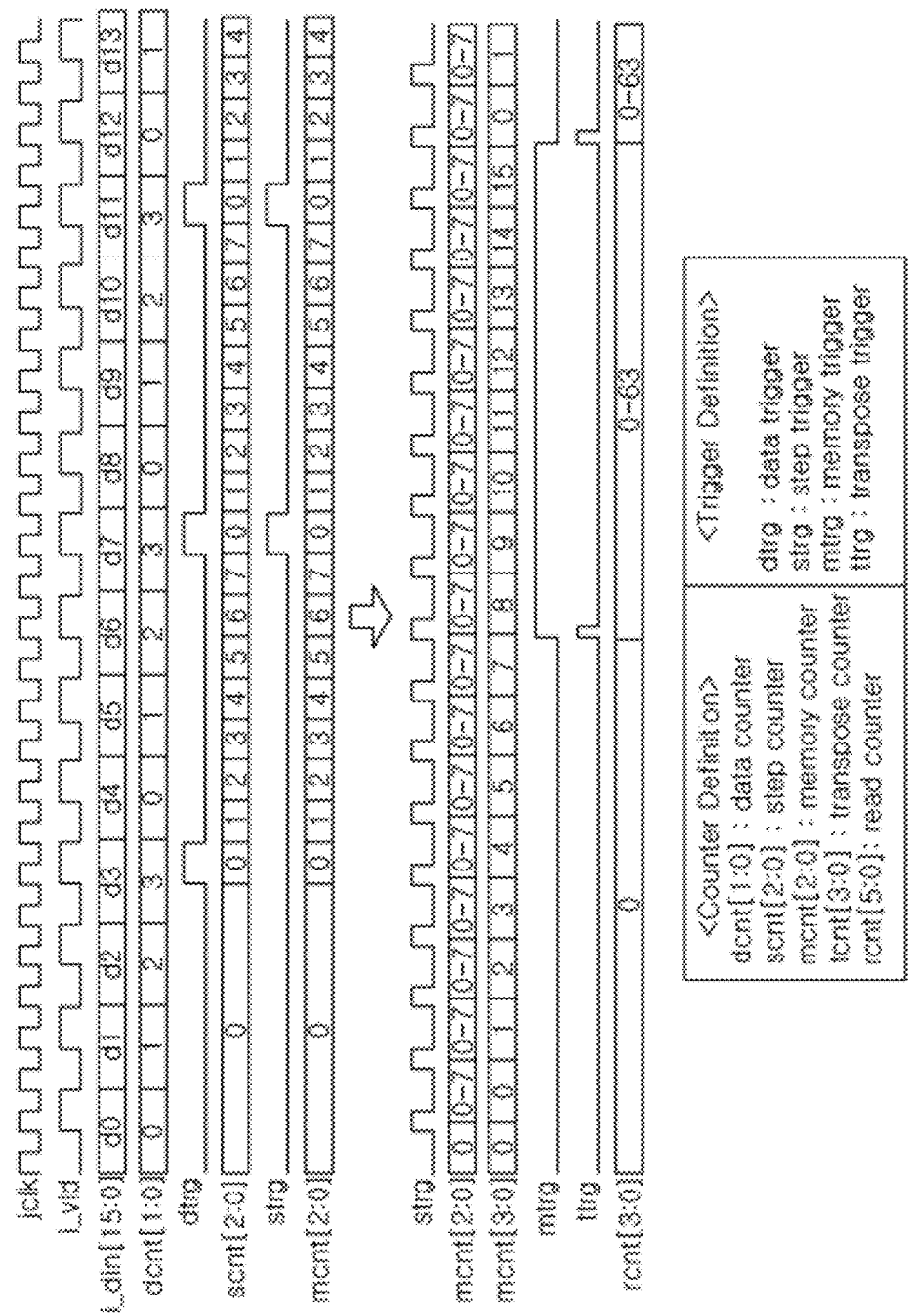
FIG. 13 is a signal timing diagram of control signals of an exemplary image processing apparatus according to an embodiment of the present invention.

For reference, various control signals required for the operations in an embodiment of the present invention may have a signal timing diagram as shown in FIG. 13.

Figure 14:
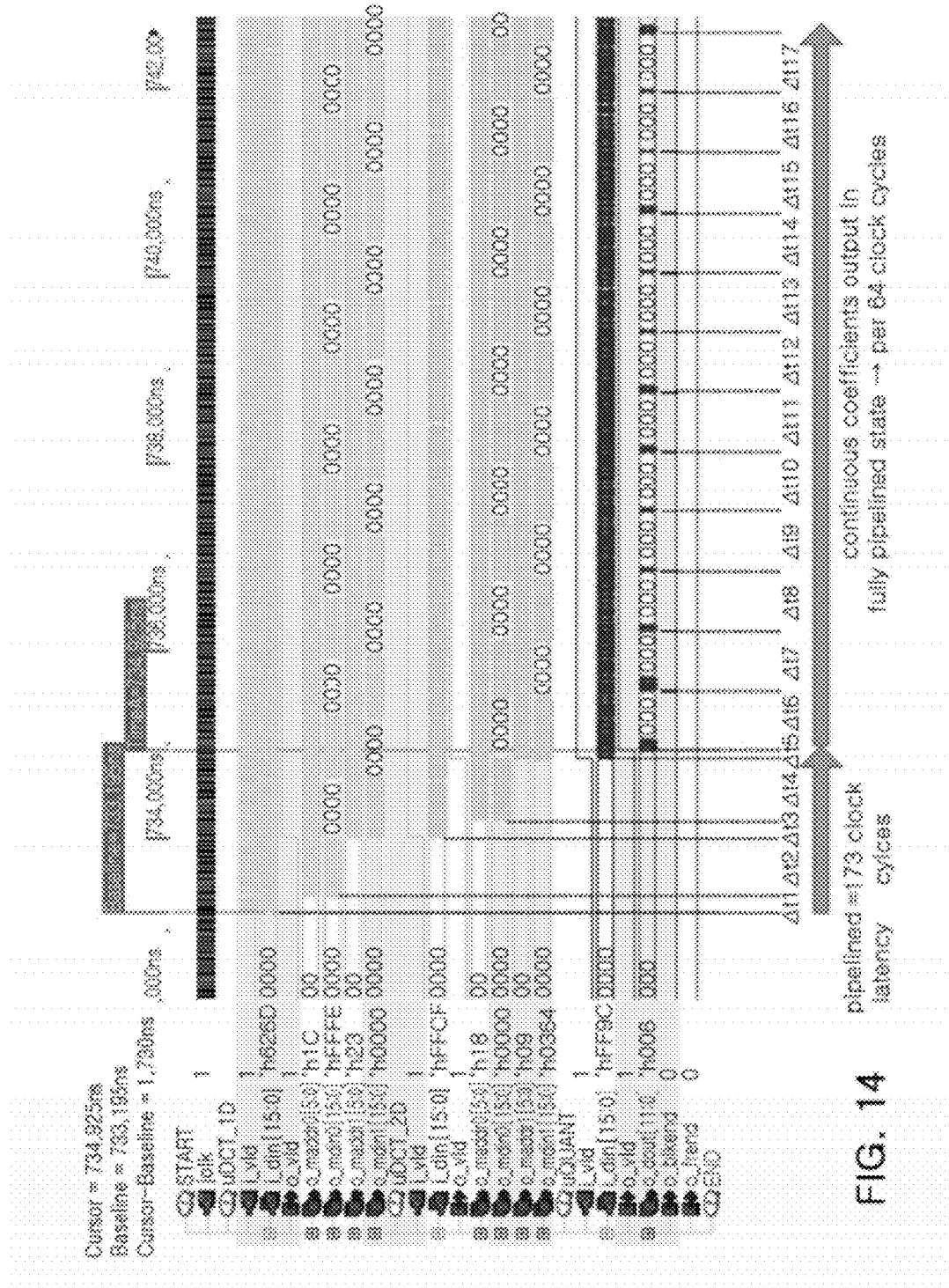
FIG. 14 is a view showing operational results of an exemplary image processing apparatus having 2D-DCT according to an embodiment of the present invention.

FIG. 14 is a view showing operational results of an exemplary image processing apparatus having 2D-DCT according to an embodiment of the present invention.

As shown in FIG. 14, it is noted that when the image processing apparatus according to an embodiment of the present invention is used, in one frame, as for first pipelined latency t1, the results with respect to 8×8 pixel blocks are output every 17 clocks; as for 8×8 pixel 2D-DCT latency t1~t3, the results with respect to 8×8 pixel blocks are output at every 100 clocks; and as for final latency t1~t5, the results with respect to 8×8 pixel blocks are output at every 173 clocks, and the results with respect to 8×8 pixel blocks are output at every 64 clocks from a pipeline full.

As set forth above, according to embodiments of the invention, the image processing apparatus and method can provide a high speed-based pipeline structure and low complexity.

While the present invention has been shown and described in connection with the embodiments, it will be apparent to those skilled in the art that modifications and variations can be made without departing from the spirit and scope of the invention as defined by the appended claims.

What is claimed:
1. An image processing apparatus comprising:
  a memory configured to store a plurality of data in a plurality of memory locations, wherein an ordinally specified data is in a corresponding ordinal memory location; and an arithmetic operation unit configured to receive data from the memory, and updating the memory with results of arithmetic operations performed on the at least one of the plurality of data, wherein in a first stage the arithmetic operation unit is configured to update for use in a second stage: a first memory location with a sum of first and eighth data, a second memory location with a sum of second and seventh data, a seventh memory location with a difference between the second and the seventh data, and an eighth memory location with a difference between the first and the eighth data, wherein in the second stage the arithmetic operation unit is configured to update for a third stage: a third memory location with a sum of third and sixth data, a fourth memory location with a sum of fourth and fifth data, a fifth memory location with a difference between the fourth and the fifth data, and a sixth memory location with a difference between the third and the sixth data, and wherein, at the third stage the arithmetic operation unit is configured to update for a fourth stage: the fifth memory location with a sum of the fifth and the sixth data, the sixth memory location with a sum of the sixth and the seventh data, and the seventh memory location with a sum of the seventh and the eighth data.

2. The apparatus of claim 1, wherein at the fourth stage the arithmetic operation unit is configured to update for a fifth stage: the first memory location with a sum of the first and the fourth data, the second memory location with a sum of the second and the third data, the third memory location with a difference of the second and the third data, the fourth memory location with a difference of the first and the fourth data, and a ninth memory location with a difference of the fifth and the seventh data, and starts multiplication of: a second cosine constant with the fifth data, a first cosine constant with the sixth data, and a third cosine constant with the seventh data.

3. The apparatus of claim 2, wherein at the fifth stage the arithmetic operation unit is configured to update for a sixth stage: the first memory location with a sum of the first and the second data, the third memory location with a sum of the third and the fourth data, the second memory location with a difference of the first and the second data, the fifth memory location with a product of the second cosine constant and the fifth data, the sixth memory location with a product of the first cosine constant and the sixth data, and seventh memory location with a product of the third cosine constant and the seventh data, and starts multiplication of a fourth cosine constant with the ninth data.

4. The apparatus of claim 3, wherein at the sixth stage the arithmetic operation unit is configured to update for a seventh stage: the sixth memory location with a sum of the eighth and the sixth data, the eighth memory location with a difference of the eighth and the sixth data, the ninth memory location with a product of the fourth cosine constant with the ninth data, and starts multiplication of the first cosine constant with the third data.

5. The apparatus of claim 4, wherein at the seventh stage the arithmetic operation unit is configured to update for an eighth stage: the fifth memory location with a sum of the fifth and the ninth data, the seventh memory location with a sum of the seventh and the ninth data, and the third memory location with a product of the first cosine constant with the third data.

6. The apparatus of claim 5, wherein at the eighth stage the arithmetic operation unit is configured to update for use following the eighth stage: the third memory location with a sum of the fourth and the third data, the fifth memory location with a sum of the eighth and the fifth data, the sixth memory location with a sum of the sixth and the seventh data, the fourth memory location with a difference of the fourth and the third data, the seventh memory location with a difference of the sixth and the seventh data, and the eighth memory location with a difference of the eighth and the fifth data.

7. The apparatus of claim 1, wherein the arithmetic operation unit comprises three addition units, three subtraction units, and four multiplication units.

8. The apparatus of claim 1, wherein the memory comprises first to ninth registers each storing first to ninth data.

9. The apparatus of claim 1, further comprising:
four level shifters converting one 16-bit data provided from the memory controller into two 8-bit data each having a range of −128 to 127 to generate the first to eighth data used for the first stage; and
a memory input controller selecting data to be input to the memory from among outputs from the four level shifters, outputs from the arithmetic operation unit, and the data stored in the memory.

10. An image processing method comprising:
initializing, by an image processing apparatus, first to eighth data, wherein each of the first to eighth data comprises a plurality of bits;
updating, by the image processing apparatus, in a first stage for use in a second stage: the first data with a sum of the first and the eighth data, a second data with a sum of second and seventh data, a seventh data with a difference between the second and the seventh data, and an eighth data with a difference between the first and the eighth data,
updating, by the image processing apparatus, in the second stage for use in a third stage: a third data with a sum of third and sixth data, a fourth data with a sum of fourth and fifth data, a fifth data with a difference between the fourth and the fifth data, and a sixth data with a difference between the third and the sixth data, and
updating, by the image processing apparatus, in the third stage for use in a fourth stage: the fifth data with a sum of the fifth and the sixth data, the sixth data with a sum of the sixth and the seventh data, and the seventh data with a sum of the seventh and the eighth data.

11. The method of claim 10, comprising:
updating, by the image processing apparatus, in the fourth stage for use in a fifth stage: the first data with a sum of the first and the fourth data, the second data with a sum of the second and the third data, the third data with a difference of the second and the third data, the fourth data with a difference of the first and the fourth data, and a ninth data with a difference of the fifth and the seventh data, and starts multiplication of: a second cosine constant with the fifth data, a first cosine constant with the sixth data, and a third cosine constant with the seventh data.

12. The method of claim 11, comprising:
updating, by the image processing apparatus, in the fifth stage for use in a sixth stage: the first data with a sum of the first and the second data, the third data with a sum of the third and the fourth data, the second data with a difference of the first and the second data, the fifth data with a product of the second cosine constant and the fifth data, the sixth data with a product of the first cosine constant and the sixth data, and seventh data with a product of the third cosine constant and the seventh data, and starts multiplication of a fourth cosine constant with the ninth data.

13. The method of claim 12, comprising:
updating, by the image processing apparatus, in the sixth stage for use in a seventh stage: the sixth data with a sum of the eighth and the sixth data, the eighth data with a difference of the eighth and the sixth data, the ninth data with a product of the fourth cosine constant with the ninth data, and starts multiplication of the first cosine constant with the third data.

14. The method of claim 13, comprising:
updating, by the image processing apparatus, in the seventh stage for use in an eighth stage: the fifth data with a sum of the fifth and the ninth data, the seventh data with a sum of the seventh and the ninth data, and the third data with a product of the first cosine constant with the third data.

15. The method of claim 14, comprising:
updating, by the image processing apparatus, in the eighth stage, for use after updating of the data used in the eighth stage: the third data with a sum of the fourth and the third data, the fifth data with a sum of the eighth and the fifth data, the sixth data with a sum of the sixth and the seventh data, the fourth data with a difference of the fourth and the third data, the seventh data with a difference of the sixth and the seventh data, and the eighth data with a difference of the eighth and the fifth data; and outputting the first to eighth data serially.

* * * * *